(12) United States Patent
Andersson et al.

(10) Patent No.: US 7,358,862 B2
(45) Date of Patent: Apr. 15, 2008

(54) RADIOSONDE SYSTEM, RADIOSONDE SYSTEM RECEIVER AND SIGNAL PROCESSING METHOD IN A RADIOSONDE RECEIVER

(75) Inventors: Henry Andersson, Espoo (FI); Juhana Jaatinen, Hyvinkää (FI); Jussi Åkerberg, Espoo (FI)

(73) Assignee: Vaisala Oyj, Helsinki (FI)

( * ) Notice: Subject to any disclaimer, the term of this patent is extended or adjusted under 35 U.S.C. 154(b) by 360 days.

(21) Appl. No.: 10/515,422

(22) PCT Filed: May 20, 2003

(86) PCT No.: PCT/FI03/00391

§ 371 (c)(1),
(2), (4) Date: Nov. 23, 2004

(87) PCT Pub. No.: WO03/100468

PCT Pub. Date: Dec. 4, 2003

(65) Prior Publication Data

US 2005/0173590 A1    Aug. 11, 2005

(30) Foreign Application Priority Data

May 24, 2002 (FI) .................................. 20020983
Jun. 13, 2002 (FI) .................................. 20021149

(51) Int. Cl.
*G08C 17/00*    (2006.01)
(52) U.S. Cl. ..................... 340/870.1; 455/323; 455/339
(58) Field of Classification Search ................ 340/870, 340/1; 455/323, 339
See application file for complete search history.

(56) References Cited

U.S. PATENT DOCUMENTS

| 4,481,514 A | | 11/1984 | Beukers et al. |
|---|---|---|---|
| 4,839,645 A | | 6/1989 | Lill |
| 5,010,343 A | * | 4/1991 | Andersson .................. 342/432 |
| 5,019,977 A | | 5/1991 | LaPointe et al. |
| 5,055,849 A | * | 10/1991 | Andersson et al. ......... 342/104 |
| 5,173,690 A | | 12/1992 | Friedman et al. |
| 5,493,721 A | * | 2/1996 | Reis ............................ 455/339 |
| 6,421,010 B1 | * | 7/2002 | Chadwick et al. .......... 342/465 |
| 7,016,663 B2 | * | 3/2006 | Sorrells et al. ............. 455/323 |
| 7,110,732 B2 | * | 9/2006 | Mostafa et al. ............. 455/130 |

\* cited by examiner

*Primary Examiner*—Albert K. Wong
(74) *Attorney, Agent, or Firm*—Birch, Stewart, Kolasch & Birch, LLP

(57) ABSTRACT

This publication discloses a radiosonde system, a radiosonde system receiver and a signal processing method for use in a radiosonde system. The radiosonde system comprises at least one radiosonde (1) with means for acquisition of position and/or weather data and means for downstream transmission of the data over a radio-frequency path, signal capture means (2, 3) for reception of the weather and/or position data, and receiver means (4) for processing the received signals, the receiver means including RF circuit elements (11) for downconversion of the received signal frequency to a lower frequency known as the first intermediate frequency. According to the invention, the receiver means (4) include sampling means (12) performing sampling at the intermediate frequency, at least two digital mixer means (13) for selective filtration of desired frequency bands from the sampled signal, and processor means (14) for parallel signal processing at the desired frequency bands.

12 Claims, 2 Drawing Sheets

Figure 1:
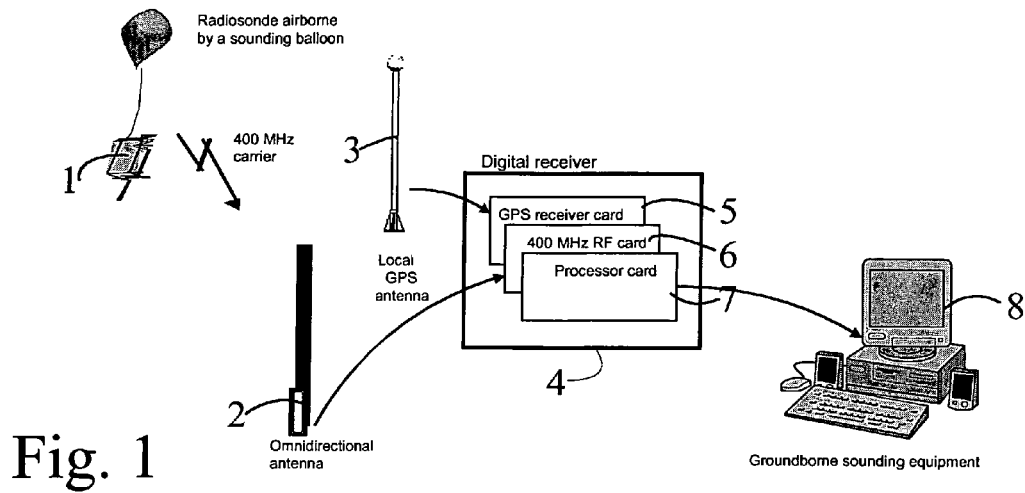

RADIOSONDE SYSTEM, RADIOSONDE SYSTEM RECEIVER AND SIGNAL PROCESSING METHOD IN A RADIOSONDE RECEIVER

The invention relates to a radiosonde system.

The invention also relates to a radiosonde system receiver and a signal processing method used in a radiosonde receiver.

Weather observations in the upper atmosphere are carried out using a radiosonde attached to a sounding balloon. Typically, the sounding balloon is a rubber balloon that is filled with hydrogen (or helium) gas and is dimensioned to elevate a radiosonde as high as up to 40 km. A radiosonde comprises a radio-frequency transmitter and various measurement equipment for registration of atmospheric phenomena. The variables most commonly measured are pressure, humidity and temperature (known as the PTU measurement from words Pressure, Temperature, Humidity) as well as wind speed and direction.

Wind measurement is based on the assumption that the sounding balloon moves along with the wind in the atmosphere at the same speed as the wind. Hence, the measurement task of wind speed and direction can be performed by measuring the radiosonde movement. This can be accomplished, e.g., by means of navigation systems, most common of them being Loran-C and GPS.

As a result of the sounding session, a profile is compiled indicating the PTU measurement values and wind data at different heights in the atmosphere.

A drawback of the prior art is that a conventional sounding session takes about 2 h, whereby the maximum distance of the radiosonde from the groundborne sounding station can be, for instance, 200 km. Hence, high demands are set on the radiosonde battery and overall performance. The batteries are purpose-designed special types and the sonde performance is improved by using a directional antenna as the receive antenna of the ground station.

Both the radiosonde battery and the directional receive antenna are relatively expensive elements. If the system could be adapted to use commercially available batteries available at a reasonable price and an omnidirectional antenna, substantial cost savings would result.

In addition to equipment cost and performance, also the size of equipment may in certain cases become a limiting factor. The best example of this complication is met in the so-called dropsonde soundings that are performed in order to investigate the development of hurricanes, for instance. Herein, plural radiosondes are dropped from an aircraft at given intervals so that a number of radiosondes are simultaneously airborne. The tracing of radiosondes is performed using a plurality of single-channel radiosonde units. The optimum solution for more efficient use of space and minimized weight of equipment aboard the aircraft would be a small-size multichannel radiosonde receiver.

In conventional radiosonde receivers, the signal is not sampled at the intermediate frequency as is the case in the present embodiment, but instead, the digital modulation is decoded using a modem circuit. This solution complicates later digital processing of the signal in the receiver. Multichannel receiver embodiments have not been hereto known in the art.

It is an object of the present invention to provide an entirely novel type of radiosonde system, radiosonde system receiver and a signal processing method for use in the receiver of a radiosonde system, all of these making it possible to overcome the above-described problems of the prior art.

The goal of the invention is achieved by way of using a single-channel or a multi-channel digital receiver as is appropriate for the needs of a given application.

The invention offers significant benefits.

The problems associated with the radiosonde system price, size and performance can be solved using a multi-channel digital receiver according to the invention with specific features optimized for radiosonde use.

A digital receiver facilitates the use of effective error correction algorithms, whereby the transmitter signal successfully detected by the receiver can have a signal quality and strength substantially lower than what has been possible in the prior art.

As a result, the receive antenna can be made simpler and cheaper. Respectively, the transmit power level of radiosondes can be lowered, whereby the use of cost-effective commercially available batteries becomes feasible.

Figure 2:
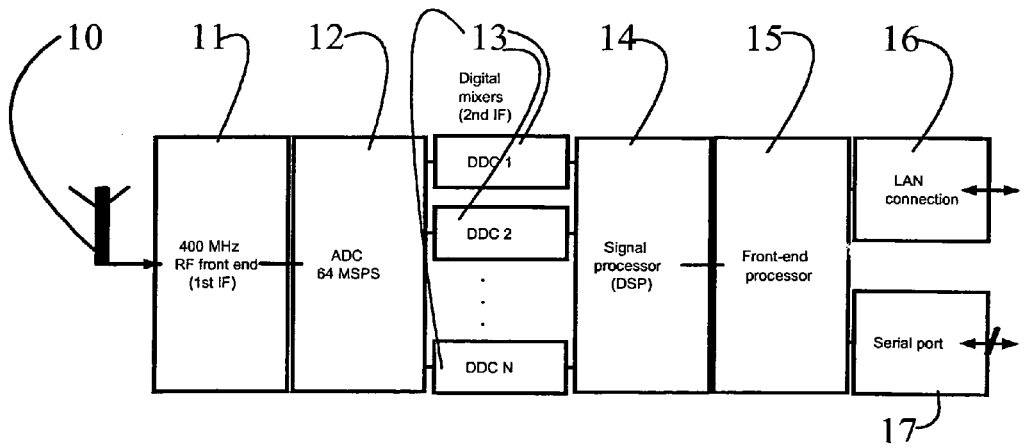
Figure 3:
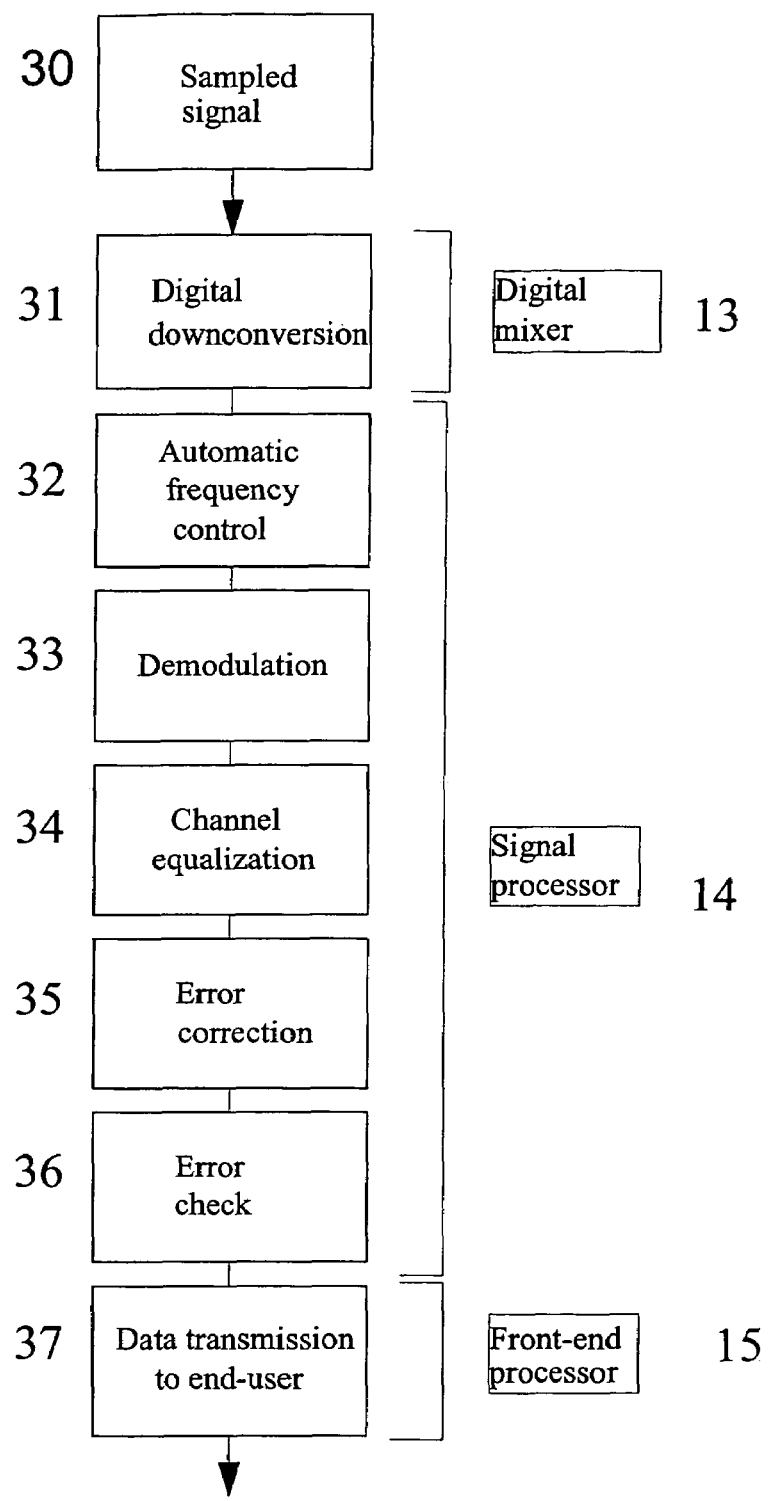

In the following, the invention is examined with the help of exemplary embodiments by making reference to the attached drawings wherein FIG. 1 shows schematically an embodiment of the system according to the invention;

FIG. 2 shows a block diagram of a digital receiver according to the invention suitable for use in a radiosonde system; and FIG. 3 shows a flow diagram of the signal processing method according to the invention;

Referring to FIG. 1, a radiosonde system shown therein comprises a radiosonde 1 that is conventionally elevated to the upper atmosphere by a gas-filled (using helium or hydrogen gas) balloon. Typically, the transmitter of radiosonde 1 sends to the ground station a digitally modulated 400 MHz signal that typically conveys pressure, humidity and temperature data. Accordingly, radiosonde 1 includes all the necessary equipment for acquisition of weather and position data and a transmitter for sending this information to further processing either at a ground station or, e.g., at a receive station located in an aircraft. In accordance with the invention, the transmitter signal can be received by an omnidirectional antenna 2 inasmuch as the novel receiver offers improved sensitivity in combination with the use of digital modulation and error correction methods. Typically, the position data signal of the radiosonde 1 is received by a separate antenna 3. Both signals received by antennas 2 and 3 are taken to a digital receiver 4 for further processing. Further processing of weather data takes place in the radio-frequency module 6 of the receiver and radiosonde position data is processed in position data module 5. Data streams from both modules are processed further in a computing module 7, whereupon the radiosonde data signal is passed to the ground station end processing equipment 8. The position data can be obtained equally well with the help of the GPS system or Loran-C or any other equivalent navigation system.

In FIG. 2 is shown the basic construction of a digital receiver suited for use in a radiosonde system. With the help of different front-end modules 11, the receiver is responsive to data received from an antenna 10 at different frequency bands. For instance in Europe, the following frequency bands are allocated for radiosonde use:
400.15-406 MHz
1668.4-1700 MHz In the 400 MHz receiver shown in FIG. 1, the signal is first downconverted in the RF front-end module 11 to a first intermediate frequency (IF). Next, the signal is sampled by an analog-digital converter 12 and again downconverted to a second intermediate frequency with the help of a digital mixer 13 (DDC). The receive signal taken to the 1680 MHz receiver may be downconverted several times prior to sampling. Otherwise this receiver performs signal processing in the same fashion as a 400 MHz receiver.

A multichannel system can be implemented using a plurality of digital mixers 13. Then, the input signal of converter 12 may cover, e.g., the entire 400 MHz radiosonde frequency band, whereby selective channel filtration takes place with the help of digital mixers 13. Further processing of the data signal takes place by means of a signal processor 14. With the help of a front-end processor 15, the signal is processed further for transmission over an LAN (Local Area Network) connection 16 or a serial port 17 in order to make the weather and position data accessible in a normal computer environment such as a Windows, NT or a Linux operating system and/or software running on these. In practice, the front-end processor 15 is a conventional PC running on suitable software such as the NT operating system.

The block diagram of FIG. 3 shows some details of end processing in one channel.

As shown in FIG. 3, the sampled signal is digitally downconverted 31 in a mixer 13. A signal processor 14 in turn performs the following steps of the method:
automatic frequency control 32,
demodulation 33,
channel equalization 34 compensating for the nonideal behavior of the channel,
error correction 35, and
error check 36.

Finally, front-end processor 15 takes care of sending 37 the data to an end-user.

Generally, the center frequency of the radiosonde signal is monitored and changes in this center frequency are automatically compensated for, thus allowing the use of a low-cost oscillation in the sonde itself. However, center frequency monitoring may be omitted in conjunction with the present invention provided that the oscillator of the radiosonde is of a sufficiently high quality.

The signal is demodulated by means of a signal processor. Transmission over the data channel takes place by digital modulation (e.g., GMSK).

After demodulation, the data signal is corrected using the state-of-the-art techniques. In conjunction with a digital data signal, such modem error correction methods as the Reed-Solomon coding scheme are available.

As error correction algorithms are capable of correcting only a limited number of errors, further checking of data integrity is necessary using verification of checksums, for instance. To this end, the data is complemented with one or more checksum algorithms suitable for indicating the integrity of received data. Plural different algorithms are available for checksum computations.

The channel equalization may also be performed using an a priori known training character sequence. Then, the transfer function of the transmission channel is computed with the help of the known character sequence and the receiver character sequence, whereby signal correction is possible using the thus computed transfer function. While channel equalization is not a mandatory operation as to the function of the present invention, it may be advantageously used for improving the system performance.

Signal processor 14 transmits the data further to the server process of the front-end processor 15 that in turn distributes the data to end-user processes over a local area network 16.

What is claimed is:

1. A radiosonde system comprising:
a plurality of radiosondes, each with means for acquisition of position and/or weather data, and means for downstream transmission of said data over a radiofrequency path,
signal capture means for reception of said weather and/or position data from said plurality of radiosondes, and
receiver means for processing said received signals, the receiver means including:
RF circuit elements for downconversion of said received signal frequency to an intermediate frequency suitable for sampling,
sampling means for said sampling at said intermediate frequency,
a plurality of digital mixer means for selective filtration of desired frequency bands from said plurality of radiosondes, and
processor means for parallel signal processing at said desired frequency bands.

2. The radiosonde system of claim 1, further comprising post-processor means for display of said weather and position data in a PC environment.

3. A radiosonde system receiver for reception of position and/or weather data from a plurality of radiosondes, the receiver comprising:
signal capture means for reception of said weather and/or position data, and
means for processing said received signals including:
RE circuit elements for downconversion of said received signal frequency to an intermediate frequency suitable for sampling,
sampling means for said sampling at said intermediate frequency,
a plurality of digital means for selective filtration of desired frequency bands from plurality of radiosondes, and
processor means for parallel signal processing at said desired frequency bands.

4. The radiosonde system receiver of claim 3, further comprising post-processor means for display of said weather and position data in a PC environment.

5. A signal processing method for use in a radiosonde system receiver, the method comprising the steps of:
receiving by signal capture means signals transmitted by a plurality of radiosondes, and
downconverting the received signal to an intermediate frequency suitable for sampling,
said sampling being carried out at said intermediate frequency,
selective filtration of desired frequency bands being performed for the sampled signal of the plurality of radiosondes, and
parallel signal processing being performed at said desired frequency bands.

6. The signal processing method of claim 5, wherein said sampled signal is downconverted by digital means.

7. The signal processing method of claim 5, wherein said signal is tracked by using automatic frequency control.

8. The signal processing method of claim 5, wherein channel equalization is carried out for said signal in order to compensate for a nonideal behavior of the data transmission channel.

9. The signal processing method of claim 1, wherein said signal is processed using error correction and checksum verification.

10. The signal processing method of claim 6, wherein said signal is tracked by using automatic frequency control.

11. The signal processing method of claim 6, wherein channel equalization is carried out for said signal in order to compensate for a nonideal behavior of the data transmission channel.

12. The signal processing method of claim 7, wherein channel equalization is carried out for said signal in order to compensate for a nonideal behavior of the data transmission channel.

* * * * *